(12) United States Patent
Kimura

(10) Patent No.: US 9,157,769 B2
(45) Date of Patent: Oct. 13, 2015

(54) REFERENCE SIGNAL GENERATION APPARATUS AND REFERENCE SIGNAL GENERATION SYSTEM

(71) Applicant: MITUTOYO CORPORATION, Kanagawa (JP)

(72) Inventor: Akihide Kimura, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 43 days.

(21) Appl. No.: 14/270,721

(22) Filed: May 6, 2014

(65) Prior Publication Data

US 2014/0339404 A1    Nov. 20, 2014

(30) Foreign Application Priority Data

May 16, 2013  (JP) ................... 2013-103902

(51) Int. Cl.
| | | |
|---|---|---|
| *G01D 5/34* | (2006.01) | |
| *G01D 5/347* | (2006.01) | |
| *G01D 5/244* | (2006.01) | |
| *G01D 5/36* | (2006.01) | |
| *G01D 5/38* | (2006.01) | |

(52) U.S. Cl.
CPC ............ *G01D 5/347* (2013.01); *G01D 5/24438* (2013.01); *G01D 5/366* (2013.01); *G01D 5/38* (2013.01)

(58) Field of Classification Search
CPC ..................... G01D 5/24438; G01D 5/347

USPC ........................................ 250/231.13–231.18
See application file for complete search history.

(56) References Cited

U.S. PATENT DOCUMENTS

| | | | |
|---|---|---|---|
| 6,674,066 B1 | 1/2004 | Kaneda et al. | |
| 2005/0205768 A1* | 9/2005 | Atsuta et al. | ............. 250/231.16 |
| 2009/0064524 A1 | 3/2009 | Howley | |
| 2009/0084945 A1* | 4/2009 | Franklin | ................... 250/231.13 |

FOREIGN PATENT DOCUMENTS

| | | |
|---|---|---|
| JP | 10-332431 | 12/1998 |
| JP | 2000-304574 | 11/2000 |
| JP | 2009-515182 | 4/2009 |

OTHER PUBLICATIONS

U.S. Appl. No. 14/270,778 to Akihide Kimura, filed May 6, 2014.

* cited by examiner

*Primary Examiner* — Thanh Luu
(74) *Attorney, Agent, or Firm* — Greenblum & Bernstein, P.L.C.

(57) ABSTRACT

A reference point detection light-receiving unit receives light from a reference point detection pattern by first to fifth light-receiving elements. The first to fifth light-receiving elements are arranged in a first direction and outputs first to fifth signals, respectively. A reference signal generation circuit outputs a reference signal that starts at a period where a level of a signal, which is obtained by adding first and second signals, and a level of a signal, which is obtained by adding third and fourth signals, will become equal, and ends at a period where a level of a signal, which is obtained by adding the second and third signals, and a level of a signal, which is obtained by adding fourth and fifth signals, become equal.

9 Claims, 9 Drawing Sheets

REFERENCE SIGNAL GENERATION APPARATUS AND REFERENCE SIGNAL GENERATION SYSTEM

INCORPORATION BY REFERENCE

This application is based upon and claims the benefit of priority from Japanese patent application No. 2013-103902, filed on May 16, 2013, the disclosure of which is incorporated herein in its entirety by reference.

BACKGROUND OF THE INVENTION

1. Field of the Invention

The present invention relates to a reference signal generation apparatus and a reference signal generation system.

2. Description of Related Art

Optical encoders are widely used to detect a position of a measurement device and the like. In an incremental encoder, a scale for detecting a relative position and a scale for detecting a reference position are provided. The incremental encoder reads the scale for detecting a reference position so as to convert detected relative position information into absolute position information. Therefore, the incremental encoder is required to detect a reference position with high accuracy.

To detect a reference position, there is a known method in which a plurality of light-receiving elements are arranged separately from each other in a reading direction of a reference point detection pattern, and a difference signal between the light-receiving elements is generated. By detecting a point where the difference signal crosses over a zero level (an intersection point), it is possible to identify a position of the reference point detection pattern in the reading direction (e.g., Japanese Unexamined Patent Application Publication No. 10-332431).

As another example of detecting an intersection point, there is a proposed method of correcting a shift in the intersection point pattern using a result of reading a pattern finer than the reference point detection pattern (Japanese Patent Translation Publication No. 2009-515182).

Further, there is another proposed method of providing a plurality of reference point detection patterns and generating a reference point by a difference in timings of reading the respective patterns (Japanese Unexamined Patent Application Publication No. 2000-304574).

SUMMARY OF THE INVENTION

However, the inventor has found out the following problems in the above-mentioned methods. In Japanese Unexamined Patent Application Publication No. 10-332431, a reference signal is generated based on one edge of the reference point detection pattern that has been read. Therefore, the edge to be a base changes according to the reading direction, and thus the timing of the reference signal changes. Accordingly, this method is unfavorable in principle in terms of improving the accuracy of a reference signal. Although Japanese Patent Translation Publication No. 2009-515182 can correct the position of a reference signal, it is necessary to perform a correction operation in advance. This will become a constraint in an operation of an encoder.

Although Japanese Unexamined Patent Application Publication No. 2000-304574 can expect to generate a highly accurate reference signal, as the light-receiving elements receive light from the plurality of respective reference point detection patterns, an optical system and the like is required. Therefore, components unnecessary in a normal encoder are added, making the configuration complicated. Further, when the reference point detection pattern is miniaturized to improve accuracy of a reference signal, a diffraction effect will become stronger and it is thus difficult to effectively read the reference point detection pattern.

The present invention is made in light of the above circumstances, and an object of the present invention is to generate a highly accurate reference signal with a simple configuration.

A first exemplary aspect of the present invention is a reference signal generation apparatus that includes: a reference point detection light-receiving unit that receives light from a reference point detection pattern, in which the light is emitted from a light source; and a reference signal generation circuit that generates a reference signal from a reading result of the reference point detection pattern read by the reference point detection light-receiving unit. The reference point detection light-receiving unit includes: first to third light-receiving elements that are aligned in order in a first direction, output a reading result of the reference point detection pattern as first to third signals, respectively, and have a first width in the first direction, in which the first direction is a reading direction of the reference point detection pattern; a fourth light-receiving element that is disposed between the first light-receiving element and the second light-receiving element, outputs the reading result of the reference point detection pattern as a fourth signal, and has a second width in the first direction; and a fifth light-receiving element that is disposed between the second light-receiving element and the third light-receiving element, outputs the reading result of the reference point detection pattern as a fifth signal, and has the second width in the first direction. The reference signal generation circuit outputs the reference signal that starts at a period where levels of a sixth signal, which is obtained by adding the first signal and the fourth signal, and a seventh signal, which is obtained by adding the second signal and the fifth signal, become equal, and ends at a period where levels of an eighth signal, which is obtained by adding the fourth signal and the second signal, and a ninth signal, which is obtained by adding the fifth signal and the third signal, become equal. Thus, it is possible to generate the reference signal with a width determined by an arrangement of the light-receiving elements. It is therefore possible to easily generate a highly accurate reference signal with a constant width only by an arrangement of elements.

A second exemplary aspect of the present invention is the above-mentioned reference signal generation apparatus, in which the first width is different from the second width. Thus, it is possible to easily generate a highly accurate reference signal with a constant width only by an arrangement of elements.

A third exemplary aspect of the present invention is the above-mentioned reference signal generation apparatus, in which the first width is smaller than the second width. Thus, it is possible to generate the reference signal with a width determined by an offset. It is therefore possible to easily generate a highly accurate reference signal with a narrow constant width only by an arrangement of elements.

A fourth exemplary aspect of the present invention is the above-mentioned reference signal generation apparatus, in which, in the reference signal generation circuit, the reference signal starts at a period where a value obtained by subtracting the seventh signal from the sixth signal becomes a predetermined value, and the reference signal ends at a period where a value obtained by subtracting the ninth signal from the eighth signal becomes a predetermined value. Thus, it is possible to easily generate a highly accurate reference signal with a constant width only by an arrangement of elements.

A fifth exemplary aspect of the present invention is the above-mentioned reference signal generation apparatus, in which the reference signal generation circuit generates a first comparison signal indicating a result of a comparison between the signal obtained by subtracting the seventh signal from the sixth signal and a first fixed potential that indicates the predetermined value, generates a second comparison signal indicating a result of a comparison between the signal obtained by subtracting the ninth signal from the eighth signal and the first fixed potential, and outputs a signal indicating a logical AND between the first comparison signal and the second comparison signal as the reference signal. Thus, it is possible to easily generate a highly accurate reference signal with a constant width only by an arrangement of elements.

A sixth exemplary aspect of the present invention is the above-mentioned reference signal generation apparatus, in which the reference signal generation circuit includes: a first adder that outputs the sixth signal that is obtained by adding the first signal and the fourth signal; a second adder that outputs the seventh signal that is obtained by adding the second signal and the fifth signal; a third adder that outputs the eighth signal that is obtained by adding the fourth signal and the second signal; a fourth adder that outputs the ninth signal that is obtained by adding the fifth signal and the third signal; a first subtracter that outputs a first difference signal that is obtained by subtracting the seventh signal from the sixth signal; a second subtracter that outputs a second difference signal that is obtained by subtracting the ninth signal from the eighth signal; a first comparator that outputs the first comparison signal that is a result of a comparison between the first difference signal and the first fixed potential; a second comparator that outputs the second comparison signal that is a result of a comparison between the second difference signal and the first fixed potential; and a first AND circuit that outputs the logical AND between the first comparison signal and the second comparison signal. The logical AND between the first comparison signal and the second comparison signal is output as the reference signal. Thus, it is possible to easily generate a highly accurate reference signal with a constant width only by an arrangement of elements.

A seventh exemplary aspect of the present invention is the above-mentioned reference signal generation apparatus, in which the reference signal generation circuit further includes: a third subtracter that outputs a third difference signal that is obtained by subtracting the first fixed value from an added value of the first to fifth signals; a third comparator that outputs a third comparison signal that is a result of a comparison between the third difference signal and a second fixed potential; and a second AND circuit that outputs a logical AND between the logical AND, which is between the first comparison signal and the second comparison signal, and the third comparison signal as the reference signal. Thus, it is possible to easily generate a highly accurate reference signal with a constant width only by an arrangement of elements.

A eighth exemplary aspect of the present invention is the above-mentioned reference signal generation apparatus further comprising: a plurality of the reference point detection light-receiving units aligned in the first direction corresponding to a plurality of the respective reference point detection patterns aligned in the first direction. The first to fifth signals are output from the plurality of the respective reference point detection light-receiving units to the reference signal generation circuit. Thus, it is possible to reduce a fluctuation in a width of a reference signal even when a foreign object is attached to a part of the plurality of reference point detection light-receiving units or a part of the plurality of reference point detection patterns.

An ninth exemplary aspect of the present invention is a reference signal generation system that includes: a light source; a scale including a reference point detection pattern formed thereon that is illuminated by the light source; a reference point detection light-receiving unit that receives light from the reference point detection pattern, in which the light is emitted by the illumination; and a reference signal generation circuit that generates a reference signal from a reading result of the reference point detection pattern read by the reference point detection light-receiving unit. The reference point detection light-receiving unit includes: first to third light-receiving elements that are aligned in order in a first direction, output a reading result of the reference point detection pattern as first to third signals, respectively, and have a first width in the first direction, in which the first direction is a reading direction of the reference point detection pattern; a fourth light-receiving element that is disposed between the first light-receiving element and the second light-receiving element, outputs the reading result of the reference point detection pattern as a fourth signal, and has a second width in the first direction; and a fifth light-receiving element that is disposed between the second light-receiving element and the third light-receiving element, outputs the reading result of the reference point detection pattern as a fifth signal, and has the second width in the first direction. The reference signal generation circuit outputs the reference signal that starts at a period where levels of a sixth signal, which is obtained by adding the first signal and the fourth signal, and a seventh signal, which is obtained by adding the second signal and the fifth signal, become equal, and ends at a period where levels of an eighth signal, which is obtained by adding the fourth signal and the second signal, and a ninth signal, which is obtained by adding the fifth signal and the third signal, become equal. Thus, it is possible to generate the reference signal with a width determined by an offset. It is therefore possible to generate a highly accurate reference signal with a constant width without being subjected to a restriction of a manufacturing process of a light-receiving element.

According to the present invention, it is possible to generate a reference signal highly accurately with a simple configuration.

The above-mentioned object and other objects, features, and advantages of the present invention shall be completely understood by the following Detailed Description and attached drawings. The attached drawings are illustrated only for graphical explanation and do not limit the present invention.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 1:
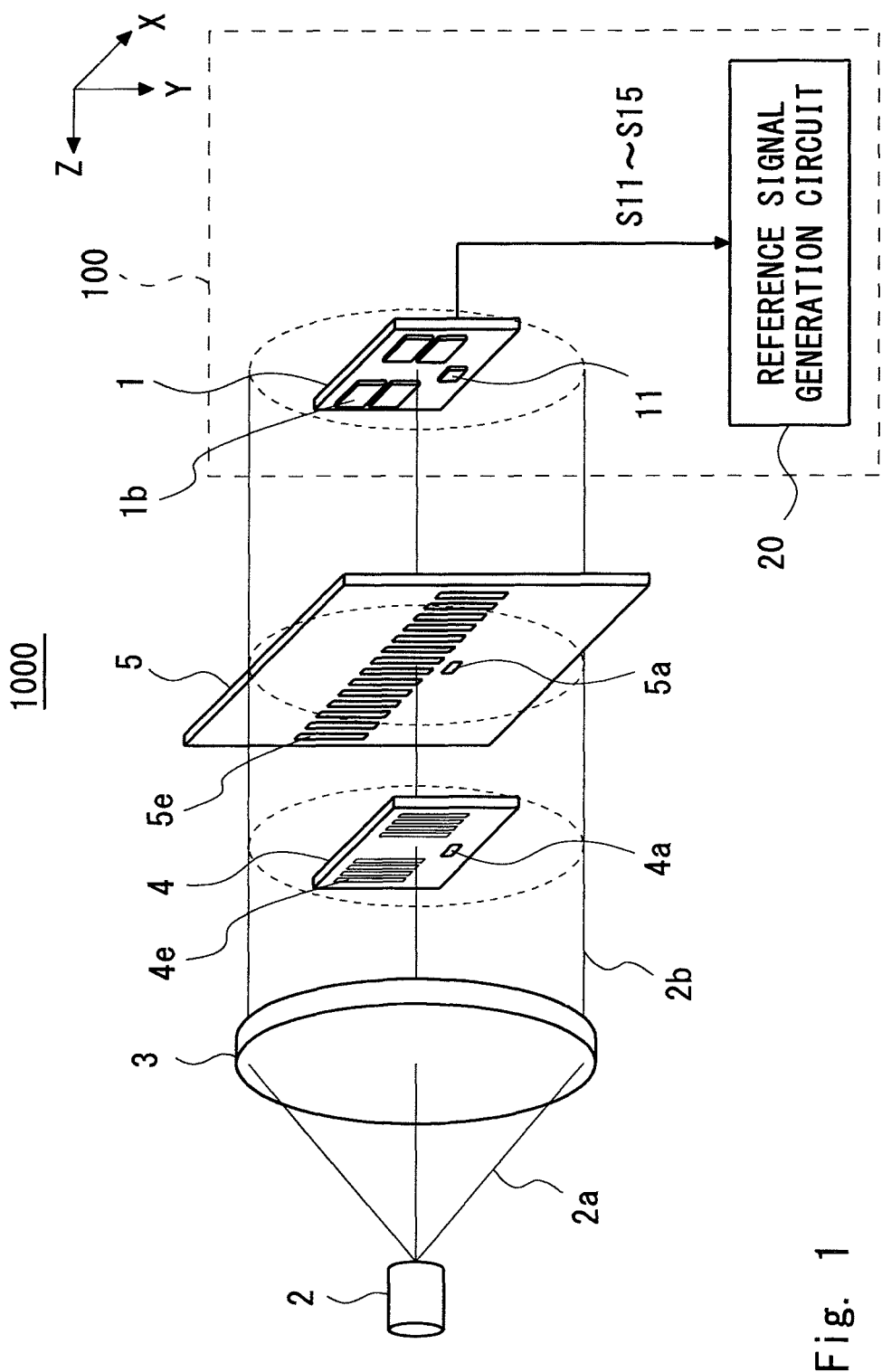
FIG. 1 is a perspective diagram schematically showing a configuration of an encoder 1000, which is an example of an encoder incorporating a reference signal generation apparatus 100 according to a first exemplary embodiment.

Hereinafter, exemplary embodiments of the present invention shall be explained with reference to the drawings. The same elements are denoted by the same reference numerals throughout the drawings, and a repeated explanation shall be omitted as necessary.

First Exemplary Embodiment

Firstly, a reference signal generation apparatus 100 according to a first exemplary embodiment shall be explained. A reference signal generation apparatus 100 is used to determine a reference position of an incremental encoder that is used to determine a position of a measurement device and the like. In order for easier understanding of a usage pattern of the reference signal generation apparatus 100, an example of an encoder incorporating the reference signal generation apparatus 100 shall be explained first. Note that as the encoder explained below incorporates a reference signal generation apparatus that generates a reference signal, the encoder may be understood as one aspect of a reference signal generation system in a broad sense.

FIG. 1 is a perspective diagram schematically showing a configuration of an encoder 1000, which is an example of an encoder incorporating the reference signal generation apparatus 100 according to the first exemplary embodiment. The encoder 1000 includes the reference signal generation apparatus 100, a light source 2, an optical element 3, an index scale 4, and a scale 5. The light source 2 is, for example, an LED (Light Emitting Diode) and emits light on the index scale 4 and the scale 5. The optical element 3 is, for example, a collimator that converts light 2a from the light source 2 into parallel light 2b. The index scale 4 and the scale 5 are arranged in order on an optical axis (a Z direction) of the parallel light 2b.

A reference point detection pattern 4a and a position detection pattern 4e are formed on the index scale 4. The reference point detection pattern 4a and the position detection pattern 4e are formed as slits perforated on a plate-like member. A reference point detection pattern 5a and a position detection pattern 5e are formed on the scale 5. The reference point detection pattern 5a and the position detection pattern 5e are formed as slits perforated on a plate-like member. Note that the index scale 4 and the scale 5 may be regarded as being an integrated component that is a scale on which the reference point detection pattern is formed.

The reference signal generation apparatus 100 is configured as an apparatus to read the reference point detection pattern 5a that is irradiated by light emitted from the light source 2 and generate a reference signal. As the reference point detection pattern 5a is a slit, a contrast of the reference point detection pattern 5a is different from surroundings of the reference point detection pattern 5a by the irradiated light. Accordingly, the reference signal generation apparatus 100 recognizes the reference point detection pattern 5a as a bright pattern.

The reference signal generation apparatus 100 includes a light-receiving unit 1 and a reference signal generation circuit 20. The light-receiving unit 1 includes a position detection light-receiving unit 1b and a reference point detection light-receiving unit 11. The position detection light-receiving unit 1b reads a pattern of the position detection pattern 5e that is irradiated by light transmitted through the position detection pattern 4e. The position detection light-receiving unit 1b outputs a signal indicating a read result to a position detection unit (not shown in the drawings). The position detection unit (not shown in the drawings) determines a detected position based on the received signal.

Figure 2:
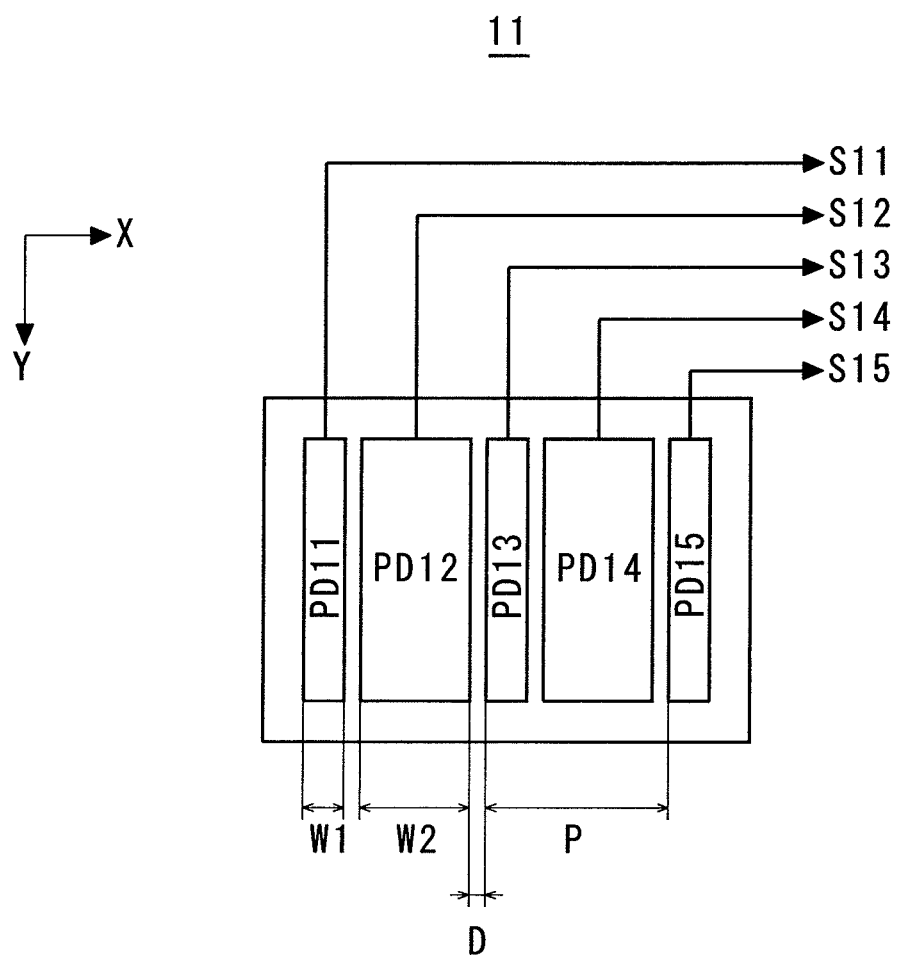
FIG. 2 is a top view schematically showing a configuration of a reference point detection light-receiving unit 11.

FIG. 2 is a top view schematically showing a configuration of the reference point detection light-receiving unit 11 according to the first exemplary embodiment. The reference point detection light-receiving unit 11 includes five light-receiving elements PD11 to PD15 arranged in an X direction (also referred to as a first direction) that is the reading direction of the reference point detection pattern 5a. The light-receiving elements PD11 to PD15 are aligned in order in the X direction with a gap D therebetween. The width of the light-receiving elements PD11, PD13, and PD15 in the X direction is W1, while the width of the light-receiving elements PD12 and PD14 in the X direction is W2 (W2>W1). Further, an arranging pitch of the light-receiving elements PD11 and PD13 in the X direction and an arranging pitch of the light-receiving elements PD12 and PD14 in the X direction shall be an arranging pitch P. Hereinafter, the light-receiving elements PD11, PD13, and PD15 shall also be referred to as first to third light-receiving elements, respectively. The light-receiving elements PD12 and PD14 are also referred to as fourth and fifth light-receiving elements, respectively.

Although described later, W1, W2, and D are parameters that determine a pulse width of the reference signal that is output from the reference signal generation apparatus 100. Although an explanation is given assuming W2>W1, a magnitude relationship between W1 and W2 is not limited to this but may be W1<W2 or W1=W2. However, in view of reducing the pulse width of the reference signal, W2>W1 is desirable. Although the gaps between the light-receiving elements PD11 to PD15 were explained as being D, the gaps between the light-receiving elements PD11 to PD15 may not be the same. Further, one of W1 and W2 shall be referred to as a first width, and the other one of W1 and W2 shall be referred to as a second width.

In the reference point detection light-receiving unit 11, the reference point detection pattern 5a is read in order by the light-receiving elements PD11, PD12, PD13, PD14, and PD15. The light-receiving elements PD11 to PD15 output brightness or darkness of the reference point detection pattern 5a that has been read as reading signals S11 to S15, respectively, to the reference signal generation circuit 20. Hereinafter, the reading signals S11, S13, and S15 are also referred to as first to third signals, respectively. The reading signals S12 and S14 are also referred to as fourth and fifth signals, respectively.

Note that in FIGS. 1 and 2, the X direction is a direction vertical to the Z direction. Further, a direction vertical to the X direction and the Z direction is an Y direction (also referred to as a second direction).

Figure 3:
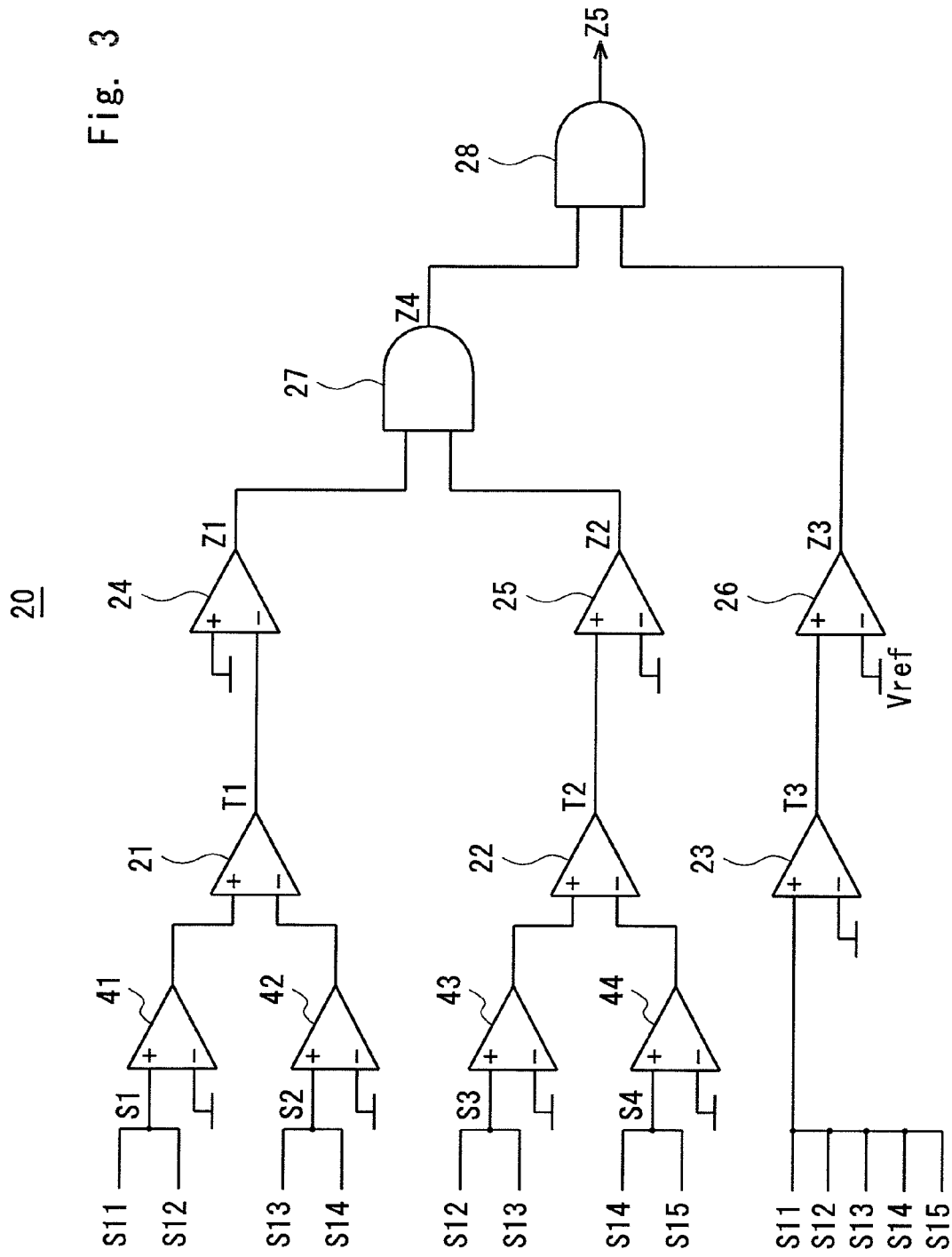
FIG. 3 is a circuit block diagram schematically showing a configuration of a reference signal generation circuit 20.

Next, a reference signal generation circuit 20 shall be explained. FIG. 3 is a circuit block diagram schematically showing a configuration of the reference signal generation circuit 20. The reference signal generation circuit 20 includes subtracters 21 to 23, comparators 24 to 26, AND circuits 27 and 28, and adders 41 to 44. Hereinafter, the subtracters 21 to 23 shall also be referred to as first to third subtracters, respectively. The comparators 24 to 26 shall also be referred to as first to third comparators, respectively. The AND circuits 27 and 28 shall also be referred to as first and second AND circuits, respectively. The adders 41 to 44 shall also be referred to as first to fourth adders, respectively.

As for the adder 41, the reading signal S1, which is obtained by adding the reading signals S11 and S12, is input to a non-inverting input, while a ground potential (also referred to a first fixed potential) is supplied to an inverting input terminal. An output terminal of the adder 41 is connected to a non-inverting input terminal of the subtracter 21. That is, the adder 41 outputs the reading signal S1, which is obtained by adding the reading signal S11 and S12, to the non-inverting input terminal of the subtracter 21.

As for the adder 42, a reading signal S2, which is obtained by adding the reading signals S13 and S14, is input to a non-inverting input, while a ground potential is supplied to an inverting input terminal. An output terminal of the adder 42 is connected to an inverting input terminal of the subtracter 21. That is, the adder 42 outputs the reading signal S2, which is obtained by adding the reading signals S13 and S14, to the inverting input terminal of the subtracter 21.

As for the adder 43, a reading signal S3, which is obtained by adding the reading signals S12 and S13, is input to a non-inverting input, while a ground potential is supplied to an inverting input terminal. An output terminal of the adder 43 is connected to a non-inverting input terminal of the subtracter 22. That is, the adder 43 outputs the reading signal S3, which is obtained by adding the reading signals S12 and S13, to the non-inverting input terminal of the subtracter 22.

As for the adder 44, a reading signal S4, which is obtained by adding the reading signals S14 and S15, is input to a non-inverting input terminal, while a ground potential is supplied to an inverting input terminal. An output terminal of the adder 44 is connected to an inverting input terminal of the subtracter 22. That is, the adder 44 outputs the reading signal S4, which is obtained by adding the reading signals S14 and S15, to the inverting input terminal of the subtracter 22.

The subtracter 21 subtracts the reading signal S2 from the reading signal S1 and outputs a subtraction result as a difference signal T1. The subtracter 22 subtracts the reading signal S4 from the reading signal S3 and outputs a subtraction result as a difference signal T2.

As for the subtracter 23, the reading signals S11 to S15 are input to the non-inverting input, while the ground potential is supplied to an inverting input terminal. The subtracter 23 subtracts the ground potential from the added signal of the reading signals S11 to S15 and outputs a subtraction result as a difference signal T3.

Note that hereinafter, the reading signals S1 to S4 are also referred to as sixth to ninth signals, respectively.

As for the comparator 24, the ground potential is input to a non-inverting input terminal, and the difference signal T1 is input to an inverting input terminal. The comparator 24 outputs a result of a comparison between the ground potential and the difference signal T1 as a signal Z1. As for the comparator 25, the difference signal T2 is input to a non-inverting input terminal, and the ground potential is input to an inverting input terminal. The comparator 25 outputs a result of a comparison between the difference signal T2 and the ground potential as a signal Z2. As for the comparator 26, the difference signal T3 is input to a non-inverting input terminal, and a reference potential Vref (also referred to as a second fixed potential) is input to an inverting input terminal. The comparator 26 outputs a result of a comparison between the difference signal T3 and the reference potential Vref as a signal Z3. Hereinafter, the signals Z1 to Z3 shall also be referred to first to third comparison signals, respectively.

The AND circuit 27 outputs a logical AND between the signals Z1 and Z2 as a pulse signal Z4. The AND circuit 28 outputs a logical AND between the signal Z3 and the pulse signal Z4 as a reference pulse signal Z5, which is a reference signal.

Figure 4:
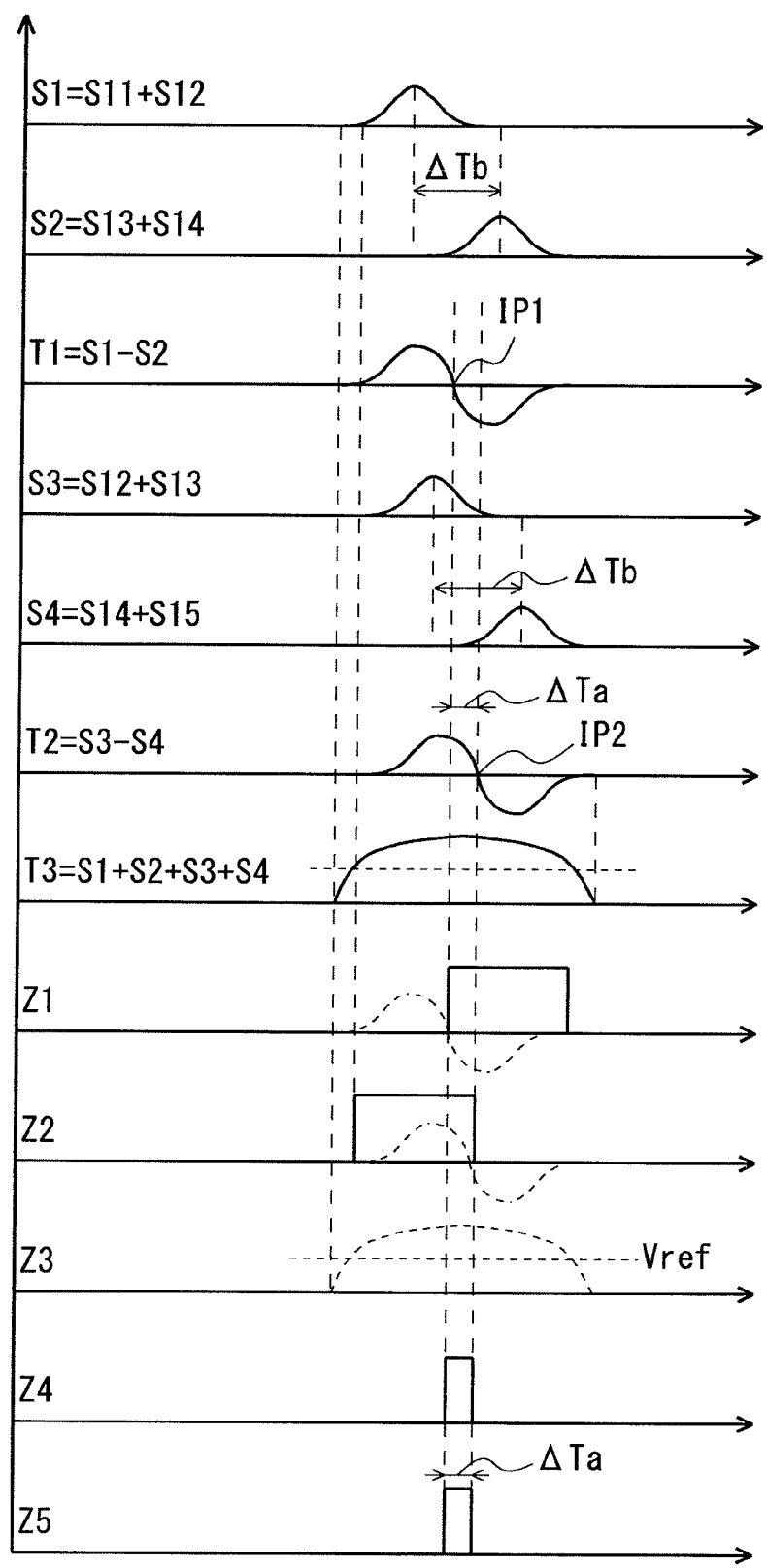
FIG. 4 is a timing chart showing an operation of the reference signal generation apparatus 100.

Next, a reference signal generation operation of the reference signal generation apparatus 100 shall be explained. FIG. 4 is a timing chart showing an operation of the reference signal generation apparatus 100.

First, the light-receiving element PD11 reads the reference point detection pattern 5a, and then a reading waveform is generated in the reading signal S11. Hereinafter, a speed of reading the reference point detection pattern 5a shall be V.

Next, the light-receiving element PD12 reads the reference point detection pattern 5a with a delay of [(W1+D)/V] from the light-receiving element PD11, and a reading waveform is generated in the reading signal S12. As a result, a reading waveform is generated in the reading signal S1, which is obtained by adding the reading signals S11 and S12. Note that in order to simplify the drawings, hereinafter, [(W1+D)/V]=ΔTa.

Next, the light-receiving element PD13 reads the reference point detection pattern 5a with a delay of (P/V) from the light-receiving element PD11, and a reading waveform is generated in the reading signal S13. As a result, a reading waveform is generated in the reading signal S3, which is obtained by adding the reading signals S12 and S13. Note that in order to simplify the drawings, hereinafter, (P/V)=ΔTb. At this time, a time interval between a peak of the reading signal S1 and a peak of the reading signal S3 will be ΔTa if the reading is carried out normally.

Next, the light-receiving element PD14 reads the reference point detection pattern 5a with a delay of ΔTa from the light-receiving element PD13, and a reading waveform is generated in the reading signal S14. As a result, a reading waveform is generated in the reading signal S2, which is obtained by adding the reading signals S13 and S14. At this time, a time interval between a peak of the reading signal S1 and a peak of the reading signal S2 will be ΔTb if the reading is carried out normally. As the subtracter 21 subtracts the reading signal S2 from the reading signal S1 by the above-mentioned configuration, an intersection point IP 1 is generated in the difference signal T1 (S1-S2). The intersection point IP1 may be understood as being a point where a level of the reading signal S1 becomes equal to a level of the reading signal S2.

Next, the light-receiving element PD15 reads the reference point detection pattern 5a with a delay of ΔTb from the light-receiving element PD13, and a reading waveform is generated in the reading signal S15. As a result, a reading waveform is generated in the reading signal S4, which is obtained by adding the reading signals S14 and S15. At this time, a time interval between a peak of the reading signal S3 and a peak of the reading signal S4 will be ΔTb if the reading is carried out normally. As the subtracter 22 subtracts the reading signal S4 from the reading signal S3 by the above-mentioned configuration, an intersection point IP2 is generated in the difference signal T2 (S3-S4). The intersection point IP2 may be understood as being a point where a level of the reading signal S3 becomes equal to a level of the reading signal S4.

The subtracter 23 outputs the difference signal T3, which is a sum signal of the reading signals S11 to S15, as described above.

The comparator 24 compares the ground potential with the difference signal T1 by the above-mentioned configuration. As a result, the signal Z1 that is output from the comparator 24 becomes HIGH in a period where the difference signal T1, which starts at the intersection point IP1, is in a period of a negative potential.

The comparator 25 compares the signal Z2 with the ground potential by the above-mentioned configuration. As a result, the signal Z2 that is output from the comparator 25 becomes HIGH in a period where the difference signal T2, which ends at the intersection point 1P2, is in a period of a positive potential.

The comparator 26 compares the signal Z3 with the reference potential. As a result, the signal Z3 that is output from the comparator 26 becomes HIGH in the period where Z3≥Vref.

The AND circuit 27 outputs a logical AND between the signal Z1 and the signal Z2 as the pulse signal Z4. That is, the pulse signal Z4 is a pulse signal that starts at the intersection point IP1 and ends at the intersection point IP2.

The AND circuit 28 outputs a logical AND between the signal Z3 and the pulse signal Z4 as the reference pulse signal Z5. In this case, the pulse signal Z4 is output as-is, as the reference pulse signal Z5.

That is, in this configuration, a timing of the reading signal S3, which is a sum signal of the reading signals S12 and S13, is delayed by ΔTa from the reading signal S1, which is a sum signal of the reading signals S11 and S12. Further, a timing of the reading signal S4, which is a sum signal of the reading signals S14 and S15, is delayed by ΔTa from the reading signal S2, which is a sum signal of the reading signals S13 and S14. Consequently, a timing of the intersection point IP2 is delayed by ΔTa from the intersection point IP1.

As described above, the reference pulse signal Z5 is a pulse signal with a width sandwiched between the intersection point IP1 and the intersection point IP2. In this configuration, the timing of the intersection point IP1 is determined only by the arrangement of the light-receiving elements PD11 to PD 14, while the timing of the intersection point 1P2 is determined only by the arrangement of the light-receiving elements PD12 to PD15. Accordingly, a difference in the timings of the intersection points IP1 and IP2 is a constant value determined by the width W1 of the light-receiving elements PD11, PD13, and PD15, the width W2 of the light-receiving elements PD12 and PD 14, and the gap D between the light-receiving elements. Thus, this configuration is capable of maintaining the pulse width of the reference pulse signal Z5, which is a reference signal, to be constant.

Therefore, according to this configuration, by determining the width of the light-receiving element in the X direction and the arranging gap D between the light-receiving elements, it is possible to set the pulse width of the reference pulse signal Z5 to a desired value.

Furthermore, in this configuration, it is possible to obtain a reference signal with a constant width without requiring special work on the side of the reference point detection 5a. Thus, in order to read a reference point detection pattern, it is not necessary to insert an optical system or the like between the reference point detection pattern and the light-receiving unit, thereby achieving a simple configuration.

Second Exemplary Embodiment

Figure 5:
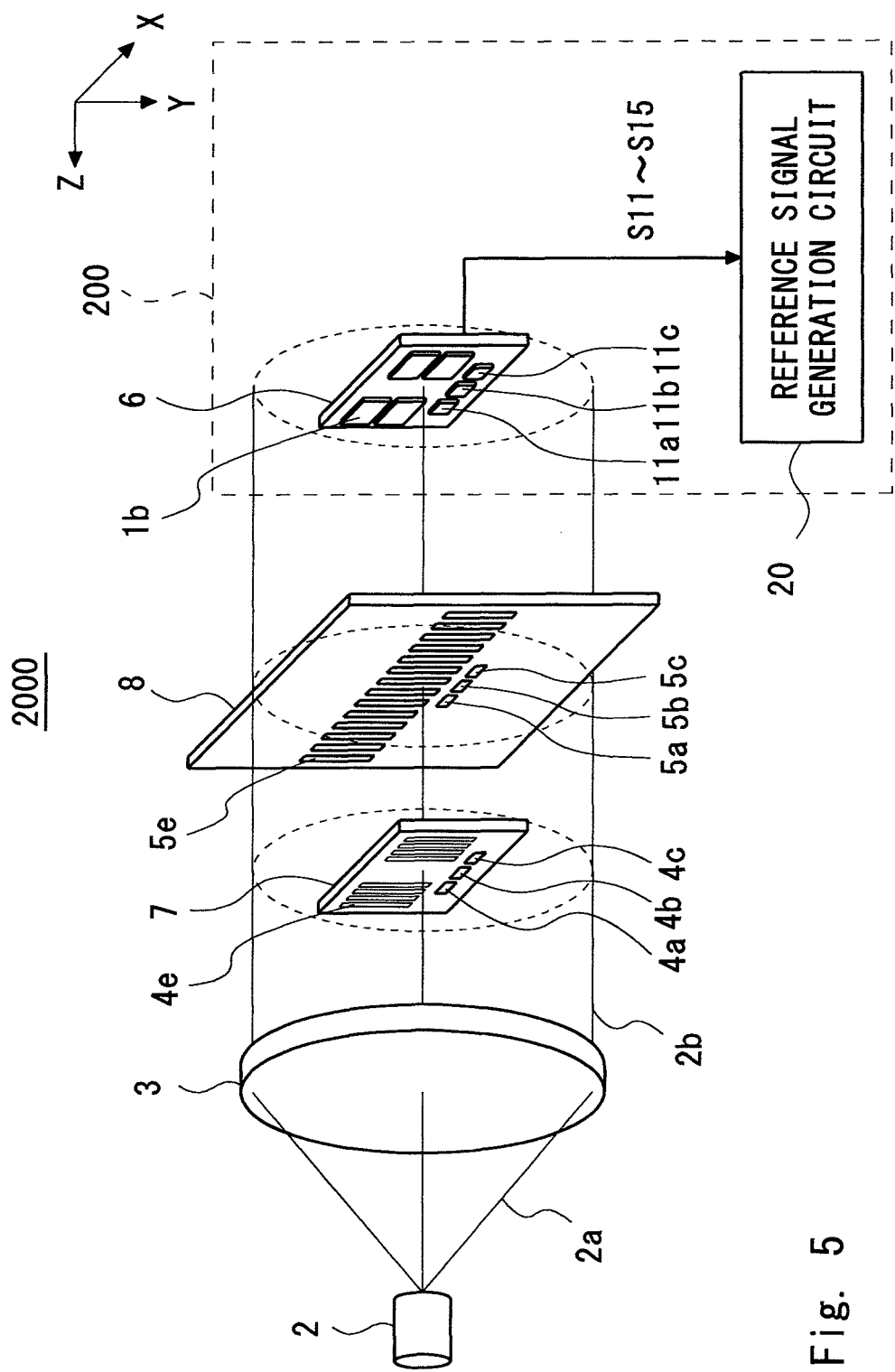
FIG. 5 is a perspective diagram schematically showing a configuration of an encoder 2000, which is an example of an encoder incorporating a reference signal generation apparatus 200 according to a second exemplary embodiment.

Next, a reference signal generation apparatus 200 according to a second exemplary embodiment shall be explained. The reference signal generation apparatus 200 is a modified example of the reference signal generation apparatus 100 and is used to determine a reference position of an incremental encoder that is used to determine a position of a measurement device or the like. FIG. 5 is a perspective diagram schematically showing a configuration of an encoder 2000, which is an example of an encoder incorporating the reference signal generation apparatus 200 according to the second exemplary embodiment. The encoder 2000 has the same configuration as that of the encoder 1000 except that the index scale 4, the scale 5, and the reference signal generation apparatus 100 in the encoder 1000 are replaced by an index scale 7, a scale 8, and the reference signal generation apparatus 200, respectively.

Reference point detection patterns 4a to 4c and a position detection pattern 4e that are aligned in the X direction are formed on the index scale 7. As the reference point detection patterns 4b and 4c are similar to the reference point detection pattern 4a, an explanation of the reference point detection patterns 4b and 4c shall be omitted. Reference point detection patterns 5a to 5c and a position detection pattern 5e that are aligned in the X direction are formed on the scale 8. The reference point detection patterns 5a to 5c are formed at the positions corresponding to the reference point detection patterns 4a to 4c, respectively. As the reference point detection patterns 5b and 5c are similar to the reference point detection pattern 5a, an explanation of the reference point detection patterns 5b and 5c shall be omitted.

Figure 6:
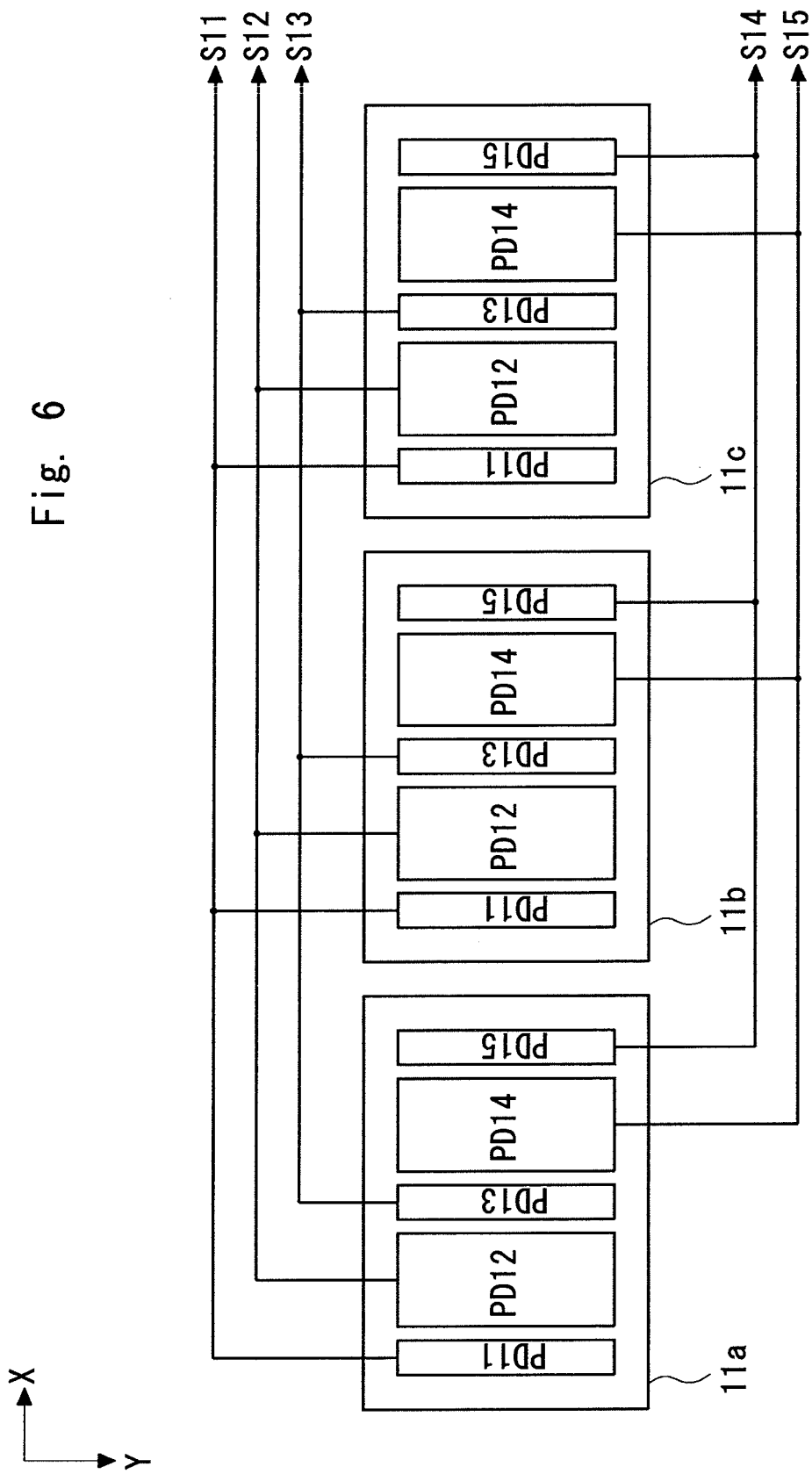
FIG. 6 is a top view schematically showing an arrangement of reference point detection light-receiving units 11a to 11c according to the second exemplary embodiment.

The reference signal generation apparatus 200 includes a light-receiving unit 6 and a reference signal generation circuit 20. The light-receiving unit 6 includes reference point detection light-receiving units 11a to 11c and a position detection light-receiving unit 1b. As the reference point detection light-receiving units 11b and 11c are similar to the reference point detection light-receiving unit 11a, an explanation of the reference point detection light-receiving units 11b and 11c shall be omitted. The reference point detection light-receiving units 11a to 11c are disposed at the positions corresponding to the reference point detection patterns 5a to 5c, respectively. FIG. 6 is a top view schematically showing an arrangement of the reference point detection light-receiving units 11a to 11c according to the second exemplary embodiment. The reference point detection light-receiving units 11a to 11c have a configuration similar to that of the reference point detection light-receiving unit 11 according to the first exemplary embodiment. The reference point detection light-receiving units 11a to 11d are aligned in the X direction, which is the reading direction. Further, the reference point detection patterns 4a to 4c and 5a to 5c are arranged to correspond to the reference point detection light-receiving units 11a to 11c, respectively.

Figure 7:
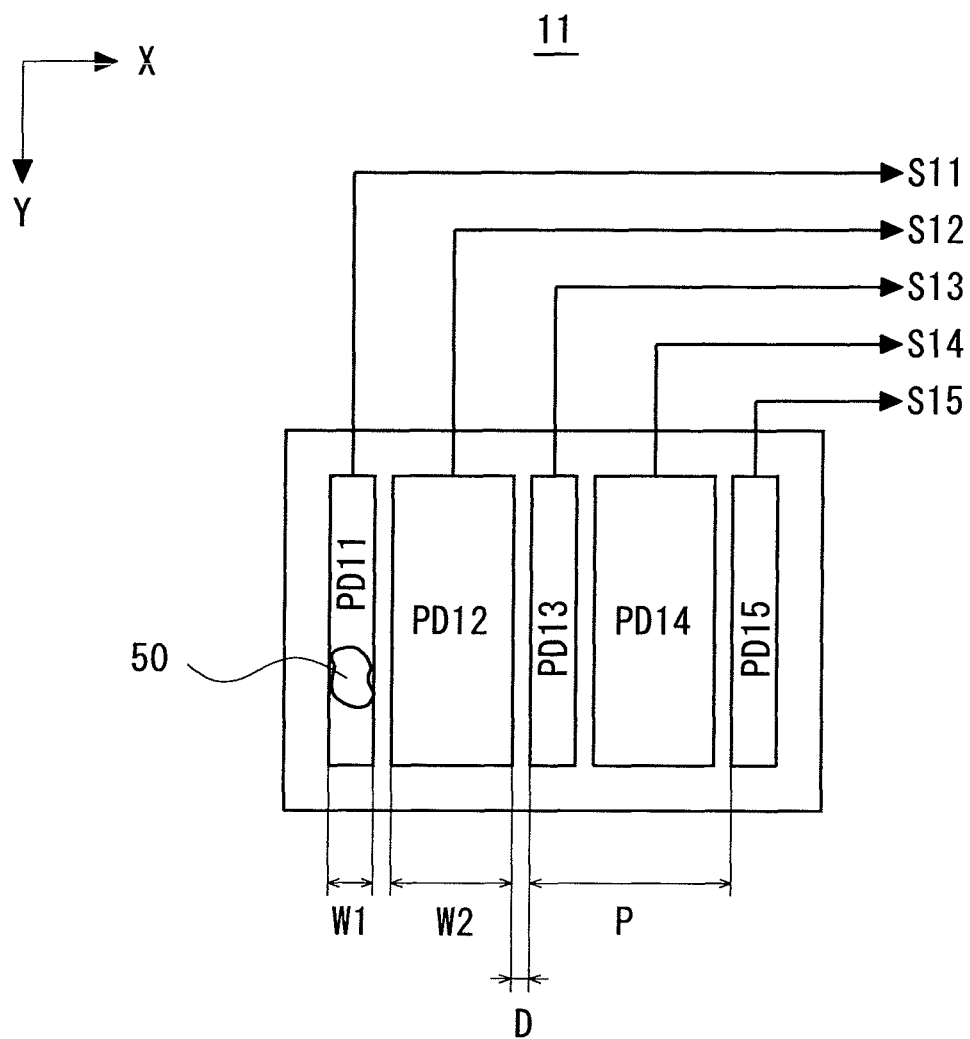
FIG. 7 is a top view showing a state where a foreign object is attached to a part of the reference point detection light-receiving unit 11 according to the first exemplary embodiment.

In order to understand advantages of the reference signal generation apparatus 200 according to this exemplary embodiment, an influence when a foreign object is attached to the reference point detection light-receiving unit 11 of the reference signal generation apparatus 100 shall be explained. FIG. 7 is a top view showing a state where a foreign object is attached to a part of the reference point detection light-receiving unit 11 according to the first exemplary embodiment. FIG.

Figure 8:
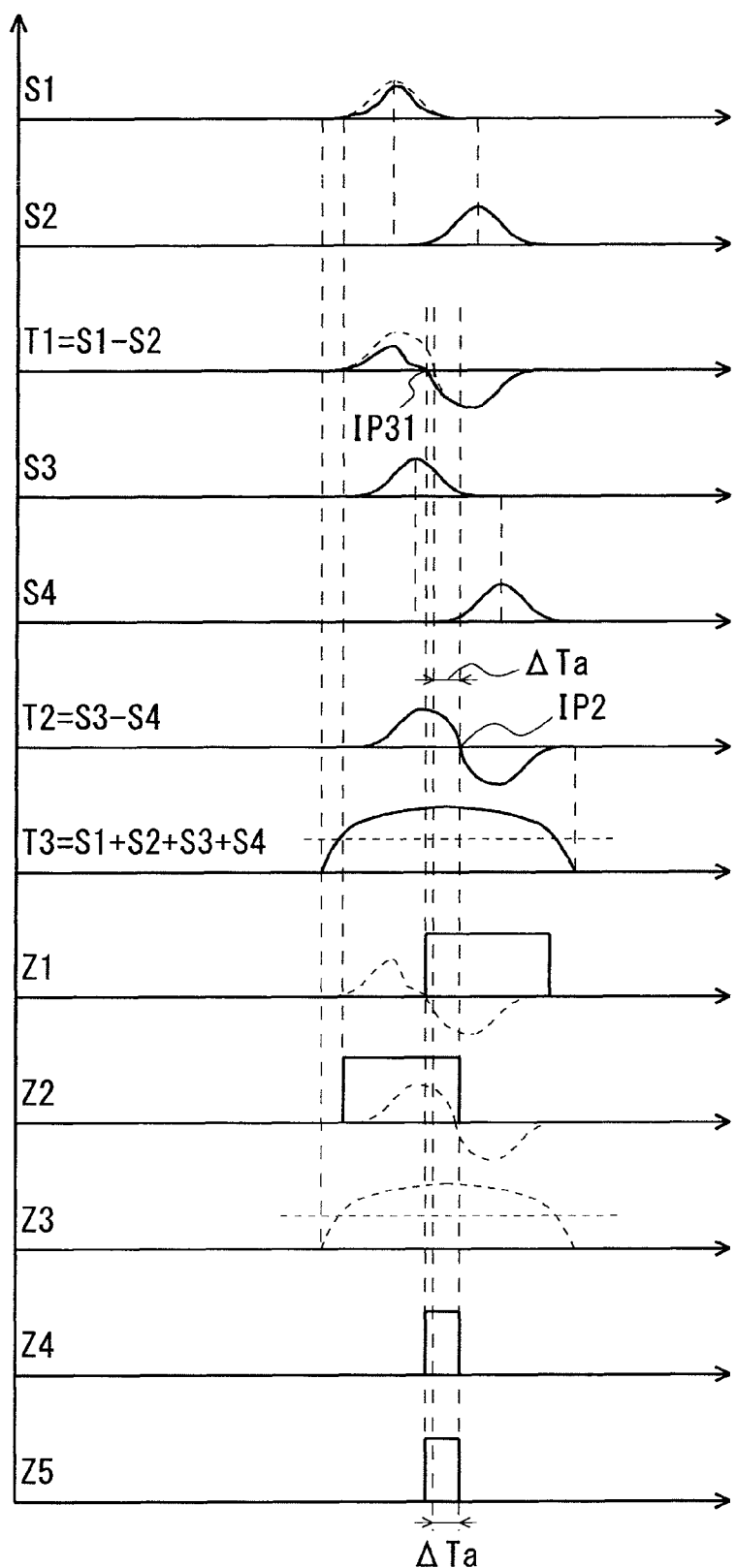
FIG. 8 is a timing chart showing a signal when a foreign object is attached to a part of the reference point detection light-receiving unit 11 according to the first exemplary embodiment.

8 is a timing chart showing a signal when a foreign object is attached to a part of the reference point detection light-receiving unit 11 according to the first exemplary embodiment. For example, when a foreign object 50 is attached to the light-receiving element PD11 of the reference point detection light-receiving unit 11, light that is supposed to be irradiated on the light-receiving element PD11 is shielded by the foreign object 50. As a result, as shown in FIG. 8, a waveform of the reading signal S1 is distorted, and a position of the intersection point moves from IP1 to IP31. Consequently, a width of a reference pulse signal fluctuates.

Figure 9:
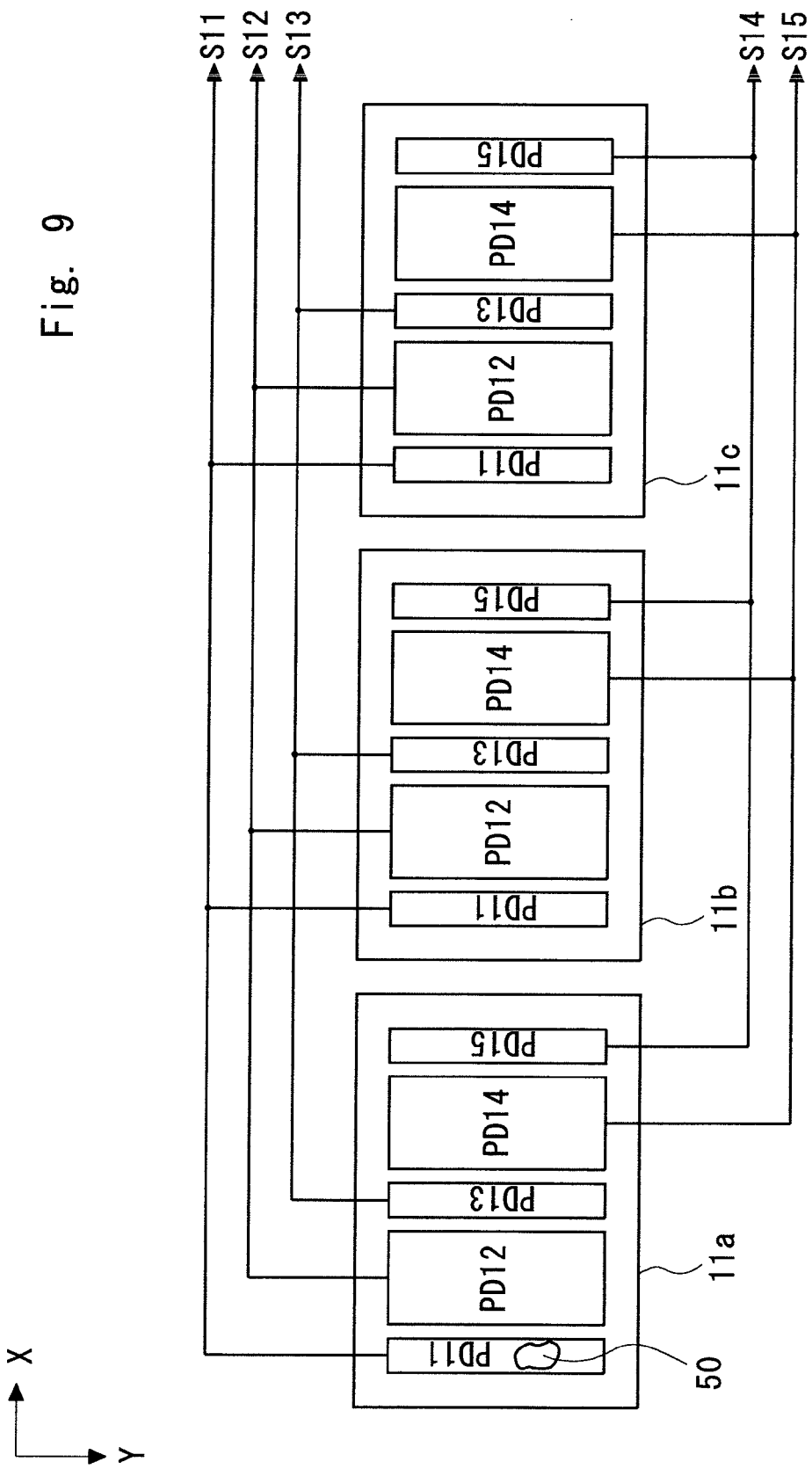
FIG. 9 is a top view showing a state where a foreign object is attached to a part of a reference point detection light-receiving unit 11a according to the second exemplary embodiment.

Meanwhile, in this configuration, as a plurality of light-receiving units are disposed in the X direction, which is the reading direction, it is possible to reduce the fluctuation in the width of the reference pulse signal that is caused by the foreign object that has been attached. FIG. 9 is a top view showing a state where a foreign object is attached to a part of the reference point detection light-receiving unit 11*a* according to the third exemplary embodiment. In this case, the reading signal S11 that is output from the light-receiving element PD 12 of the reference point detection light-receiving units 11*a* to 11*c* will have a distorted waveform due to an influence that the foreign object 50 is attached to the light-receiving element PD12 of the reference point detection light-receiving unit 11*a*. The distortion appears as a distortion in the waveform of the reading signal S1. As a result, the position of the intersection point moves.

However, in this configuration, the reading signals S11 to S15 that are output from the reference point detection light-receiving units 11*a* to 11*c* are added. Accordingly, even when foreign objects are attached to a part of the plurality of reference point detection light-receiving units, a signal with a normal waveform is output from the reference point detection light-receiving unit to which no foreign object is attached. As a result, even when a foreign object is attached to the light-receiving element PD 12 of the reference point detection light-receiving unit 11*a*, a distortion in the waveform of the reading signal S1 can be reduced. Consequently, it is possible to prevent the intersection point of the difference signal T1 from moving.

Therefore, according to this configuration, it is possible to reduce or prevent a fluctuation in a width of a reference pulse signal even when a foreign object is attached to a light-receiving unit.

Note that although a case where a foreign object is attached to a light-receiving element has been explained so far, this is merely an example. It is obvious that the above explanation applies to a case where a foreign object is attached to a reference point detection pattern of the index scale or the scale.

Further, although a case where the number of the reference point detection patterns and the reference point detection light-receiving units is three has been explained so far, this is merely an example. The number of the reference point detection patterns and the reference point detection light-receiving units may be any plural number other than three.

Other Exemplary Embodiment

Note that the present invention is not limited to the above exemplary embodiments, and modifications can be made as appropriate without departing from the scope of the present invention. For example, the above reference signal generation circuit is merely an example. That is, as long as a reference signal similar to the one generated by the above reference signal generation circuit can be generated based on a signal from the reference point detection light-receiving unit, the configuration of the reference signal generation circuit may be changed as appropriate.

Although the above-described exemplary embodiments explained the light source 2 as being an LED, this is merely an example. The LED may be monochrome or white. Further, a laser diode or other laser devices may be used as the light source. Furthermore, a common broadband light source such as a halogen lamp may be used as the light source.

Although a transmissive encoder has been explained in the above exemplary embodiments, this is merely an example. Therefore, the encoder according to the above exemplary embodiments may be a so-called reflective encoder in which light is reflected by a scale and the reflected light is received by a position detection light-receiving unit.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A reference signal generation apparatus comprising:
a reference point detection light-receiving unit that receives light from a reference point detection pattern, the light being emitted from a light source; and
a reference signal generation circuit that generates a reference signal from a reading result of the reference point detection pattern read by the reference point detection light-receiving unit, wherein
the reference point detection light-receiving unit comprises:
first to third light-receiving elements that are aligned in order in a first direction, output a reading result of the reference point detection pattern as first to third signals, respectively, and have a first width in the first direction, the first direction being a reading direction of the reference point detection pattern;
a fourth light-receiving element that is disposed between the first light-receiving element and the second light-receiving element, outputs the reading result of the reference point detection pattern as a fourth signal, and has a second width in the first direction; and
a fifth light-receiving element that is disposed between the second light-receiving element and the third light-receiving element, outputs the reading result of the reference point detection pattern as a fifth signal, and has the second width in the first direction, and
the reference signal generation circuit outputs the reference signal that starts at a period where levels of a sixth signal, which is obtained by adding the first signal and the fourth signal, and a seventh signal, which is obtained by adding the second signal and the fifth signal, become equal, and ends at a period where levels of an eighth signal, which is obtained by adding the fourth signal and the second signal, and a ninth signal, which is obtained by adding the fifth signal and the third signal, become equal.

2. The reference signal generation apparatus according to claim 1, wherein the first width is different from the second width.

3. The reference signal generation apparatus according to claim 2, wherein the first width is smaller than the second width.

4. The reference signal generation apparatus according to claim 1, wherein, in the reference signal generation circuit,
the reference signal starts at a period where a value obtained by subtracting the seventh signal from the sixth signal becomes a predetermined value, and
the reference signal ends at a period where a value obtained by subtracting the ninth signal from the eighth signal becomes a predetermined value.

5. The reference signal generation apparatus according to claim 4, wherein the reference signal generation circuit
generates a first comparison signal indicating a result of a comparison between the signal obtained by subtracting the seventh signal from the sixth signal and a first fixed potential that indicates the predetermined value,
generates a second comparison signal indicating a result of a comparison between the signal obtained by subtracting the ninth signal from the eighth signal and the first fixed potential, and
outputs a signal indicating a logical AND between the first comparison signal and the second comparison signal as the reference signal.

6. The reference signal generation apparatus according to claim 5, wherein the reference signal generation circuit comprises:
a first adder that outputs the sixth signal, the sixth signal being obtained by adding the first signal and the fourth signal;
a second adder that outputs the seventh signal, the seventh signal being obtained by adding the second signal and the fifth signal;
a third adder that outputs the eighth signal, the eighth signal being obtained by adding the fourth signal and the second signal;
a fourth adder that outputs the ninth signal, the ninth signal being obtained by adding the fifth signal and the third signal;
a first subtracter that outputs a first difference signal, the first difference signal being obtained by subtracting the seventh signal from the sixth signal;
a second subtracter that outputs a second difference signal, the second difference signal being obtained by subtracting the ninth signal from the eighth signal;
a first comparator that outputs the first comparison signal, the first comparison signal being a result of a comparison between the first difference signal and the first fixed potential;
a second comparator that outputs the second comparison signal, the second comparison signal being a result of a comparison between the second difference signal and the first fixed potential; and
a first AND circuit that outputs the logical AND between the first comparison signal and the second comparison signal, and
the logical AND between the first comparison signal and the second comparison signal is output as the reference signal.

7. The reference signal generation apparatus according to claim 6, wherein the reference signal generation circuit further comprises:
a third subtracter that outputs a third difference signal, the third difference signal being obtained by subtracting the first fixed value from an added value of the first to fifth signals;
a third comparator that outputs a third comparison signal, the third comparison signal being a result of a comparison between the third difference signal and a second fixed potential; and
a second AND circuit that outputs a logical AND between the logical AND, which is between the first comparison signal and the second comparison signal, and the third comparison signal as the reference signal.

8. The reference signal generation apparatus according to claim 1, further comprising:
a plurality of the reference point detection light-receiving units aligned in the first direction corresponding to a plurality of the respective reference point detection patterns aligned in the first direction, wherein
the first to fifth signals are output from the plurality of the respective reference point detection light-receiving units to the reference signal generation circuit.

9. A reference signal generation system comprising:
a light source;
a scale including a reference point detection pattern formed thereon that is illuminated by the light source;
a reference point detection light-receiving unit that receives light from the reference point detection pattern, the light being emitted by the illumination; and
a reference signal generation circuit that generates a reference signal from a reading result of the reference point detection pattern read by the reference point detection light-receiving unit, wherein
the reference point detection light-receiving unit comprises:
first to third light-receiving elements that are aligned in order in a first direction, output a reading result of the reference point detection pattern as first to third signals, respectively, and have a first width in the first direction, the first direction being a reading direction of the reference point detection pattern;
a fourth light-receiving element that is disposed between the first light-receiving element and the second light-receiving element, outputs the reading result of the reference point detection pattern as a fourth signal, and has a second width in the first direction; and
a fifth light-receiving element that is disposed between the second light-receiving element and the third light-receiving element, outputs the reading result of the reference point detection pattern as a fifth signal, and has the second width in the first direction, and
the reference signal generation circuit outputs the reference signal that starts at a period where levels of a sixth signal, which is obtained by adding the first signal and the fourth signal, and a seventh signal, which is obtained by adding the second signal and the fifth signal, become equal, and ends at a period where levels of an eighth signal, which is obtained by adding the fourth signal and the second signal, and a ninth signal, which is obtained by adding the fifth signal and the third signal, become equal.

* * * * *